Patented July 7, 1936

2,046,567

UNITED STATES PATENT OFFICE 2,046,567

FLAVORING MATERIAL

Albert Adams Lund, Port Washington, N. Y., assignor to Royal Baking Powder Company, New York, N. Y., a corporation of New Jersey No Drawing. Application August 16, 1932,
Serial No. 628,987

12 Claims. (Cl. 99—141)

The invention relates to a saccharine composition having a liquid phase and a high solid content, to a flavoring material prepared through the use of such saccharine composition, to food mixtures prepared through the utilization of the flavoring materials, and to a process whereby the compositions may be produced. More particularly, the invention refers to a dextrose hydrate having a high solid content and a liquid phase containing a flavoring substance, and includes correlated improvements and discoveries whereby the preparation of the dextrose hydrate containing a flavoring substance is enhanced.

A flavoring material in a comminuted form, which is dry-to-the-touch and non-hygroscopic, finds an important field for utilization in the preparation of gelatin desserts. This is particularly the case if the flavoring substance in the flavoring material is protected and preserved. The invention will be especially described and the distinctive features and particular utility set forth in connection with the preparation of a gelatin dessert, but it will be understood that definite applicability exists in other fields.

A disadvantage and handicap in the marketing of gelatin desserts has been their relatively brief "shelf life", or period during which they retain their flavor and remain in prime condition. An exposure of two or three weeks under the usual marketing conditions ordinarily suffices to occasion a marked diminution in strength and quality of the flavoring substances, which are perhaps the most important ingredient of the dessert composition, and hence in a comparatively short time the product becomes flat tasting, characterless, and unsuited for sale. It is an object of the invention to overcome these disadvantages.

It is an object of the invention to provide a saccharine material having a high solid content and a liquid phase and which, in comminuted form, has high absorptive capacity for a flavoring substance and may be readily, efficiently and economically manufactured on a commercial scale.

A further object of the invention is to provide a saccharine material which is capable of entrapping and preserving liquid flavoring substances therein, and is of increased flavor-carrying capacity.

Another object of the invention is to provide a process for the preparation of saccharine compositions containing a flavoring substance and, more particularly, for preparing a comminuted dry-to-the-touch flavoring material containing in liquid form substantial quantities of essential oils, flavoring extracts, essences, etc.

It is also an object of the invention to provide a flavoring material in which the flavoring substance possesses greater fidelity to source and aroma than the highly concentrated chemically processed and artificially fortified flavors which have previously been in general use.

Other objects of the invention are to provide a process for the preparation of flavoring materials whereby the flavoring substance is safeguarded from undue deterioration and excessive loss of volatile flavoring substance by evaporation largely prevented.

A still further object of the invention is to provide dessert powders, jelly powders, and similar food mixtures possessing enhanced palatability, increased flavoring ability, and improved keeping qualities, and a process whereby such powders and food mixtures may be prepared.

Other objects of the invention will in part be obvious and will in part appear hereinafter.

The invention accordingly comprises the several steps and the relation of one or more of such steps with respect to each of the others, and the product possessing the features, properties, and relation of constituents, which are exemplified in the following detailed disclosure, and the scope of the invention will be indicated in the claims.

In the practice of the invention a saccharine composition may be prepared by dissolving a saccharine substance in water, concentrating to a desired liquid content, cooling, and crystallizing, whereby there is formed a solid mass which may be readily broken up and comminuted and yields particles having a high solid content and a liquid phase. With the saccharine composition during its course of preparation there may be incorporated a flavoring substance, and thereby there may be prepared a flavoring material as dry-appearing or dry-to-the-touch particles of a saccharine substance which contains a closely confined syrup phase within which a considerable quantity of a flavoring substance may be disposed. The solidified sugar composition having a liquid phase and a high solid content will be hereinafter referred to as a massecuite. The comminuted flavoring materials having a flavoring substance in the liquid phase of the comminuted massecuite are well adapted and may be used for the preparation of various food mixtures, e. g., gelatin dessert powders, by admixing the flavoring material with the other ingredients entering thereinto.

The saccharine material, or sugar, utilized may be that derived from any suitable source, such as sucrose, lactose, maltose, dextrose, etc. I prefer to use a commercial refined dextrose hydrate, or corn sugar, or in its stead a refined anhydrous dextrose in a quantity equal to that contained in the dextrose hydrate.

As an illustrative embodiment of a manner in which the invention may be practiced, the following description is presented.

A quantity of a refined dextrose hydrate (commercial corn sugar), approximately one-third of the normal sugar requirement of a desired dessert batch, is taken and put into solution in water. The solution so obtained is then cooked, e. g. at a temperature of about 230-238° F., or otherwise concentrated to a point where the moisture content of the batch is from about 9% to 30% by weight, the exact point depending upon the amount of the flavor subsequently to be added.

The moisture content of the batch is preferably not below approximately 9.1%, which corresponds to the crystal water requirement of the dextrose molecule, as otherwise the crystallization of the sugar from solution will be considerably delayed. It is to be noted that the batch is brought to a final density materially higher than that obtained in the normal preparation of so-called "dextrose-phase fondants" after dilution with the customary syrup "bob", inasmuch as a hard and brittle mass or massecuite wholly unsuited for fondant purposes is obtained and required for subsequent comminution into the desired particle form.

When the batch has been brought to the required density, it is cooled to below 98° F., preferably to 60° F., at which point crystallization proceeds rapidly. The cooled magma may be seeded with crystals of dextrose hydrate, and is finally crystallized in known manner. I prefer to accomplish the crystallization under agitation as, for example, in a dough mixer or screw-type fondant creaming machine, since by this means the crystal size is kept small and the surface area of the intervening films is proportionately large. An amount of a flavoring substance, e. g., an essential oil, or a flavor extract, or essence sufficient to impart the desired flavoring strength to the mixture is dispersed in the batch after it has cooled and either before, although preferably after, the crystallization has commenced.

When the flavored massecuite has attained a satisfactory degree of crystallization as evidenced by a creamy or lardy consistency, it is removed from the mixer and spread out in thin sheets upon a well-waxed or lubricated surface, where the crystallization continues until a hard, brittle mass results. This solidified massecuite is removed from the slab, chopped up, and ground or otherwise comminuted to a particle size approximating that of the particles which will comprise the remainder of a dessert mixture (usually about 20 to 40 mesh). This is desirable in order to secure a relatively uniform particle size in the completed mixture and prevent "sifting".

If the comminuted massecuite be permitted to stand for about 24 hours, it will be found to have caked into a readily friable mass which, when broken up, shows no appreciable tendency to reform. During this period, a redistribution of the syrup and flavor films occurs within the particles and an outer or protecting "shell" structure is formed. The flavoring material is now ready to be mixed with the other constituents of a dessert powder or other food mixture.

Color may be added to the massecuite alone or to the other dessert ingredients or to the total mixture, as desired. However, to obtain an attractive and uniform color in the finished dessert mixture, it is preferable to add the bulk of the color to the massecuite, reserving a small proportion with which to impart a uniform pastel shade to the completed mixture by spraying. If all of the color be incorporated in the massecuite, the solid massecuite particles will be white or only very faintly colored notwithstanding; and it is for this reason that it is desirable to apply a small amount of the color to all external surfaces of the completed mixture. On the other hand, if all of the color be applied to the final mixture, including the flavored massecuite particles, the excess moisture of the color solution is likely to render the massecuite particles sticky and may make it necessary to resort to drying, which the invention seeks to avoid.

A gelatin dessert of average composition made in accordance with the invention would comprise the following approximate quantities of the various materials:

| | |
|---|---|
| Comminuted flavored massecuite (containing flavoring substance or substances q. s.) | 30 parts |
| Granulated sugar | 60 parts |
| Granulated edible gelatin | 8,25 parts |
| Tartaric acid | 1,75 parts |
| Coloring matter | q. s. |

The preparation of the massecuite above described differs from the making of a dextrose fondant in at least three important particulars, namely, (1) no other sugar, or repressant of crystallization such as corn syrup, etc., is incorporated or permitted to form in the massecuite at any stage of the process; (2) the concentration of the magna is carried to a point beyond the normal density of a fondant in order to obtain a massecuite which will solidify quickly and grind up readily into syrup-and-flavor-binding crystal aggregates of the desired size; and (3) the character of the massecuite must be such that it will carry comparatively large volumes of flavor capable of withstanding the dilution (e. g. with water up to 5 to 10 times its own weight) to which such dessert mixtures are subjected in the home, without losing the required brittleness for grinding or its dryness to the touch. The massecuite is distinguished by the encasing or shell-like protecting structure hereinafter described.

A distinctive feature of the massecuite particle used as the carrier for the flavor is the microscopic character of its crystal structure and the resulting greatly increased surface areas available for the adsorption of the flavoring substance by its internal films. The films which are located at or near the outer surfaces of the particles, and in consequence subject to the evaporating and oxidizing forces, represent only a small proportion of the total film area containing the flavor.

Another feature of the particle is the substantial quantity of free liquid which the apparently dry mass holds in its liquid or syrup phase. So thin are the syrup and/or flavor films that the crystals of the massecuite firmly adhere to one another, forming a solid substance that is brittle and dry to the touch. Notwithstanding this apparent dryness, it is possible to express from such masses, by hydraulic pressure without heat, upwards of 20 to 25% of free syrup and flavor, which indicates the presence of a very much higher percentage in the unpressed massecuite.

A further feature of the peculiar particle structure is an impervious outer "shell" or crust of crystalline sugar which envelops the particle as the films located at its outer surfaces dry out. In drying out, these films deposit their solute among the crystal interstices at the particle surface, filling up the gaps until a practically continuous structure or "crust" is obtained. Once formed, this crust prevents any further loss of flavor due to capillary migration of the films to the exposed particle surfaces, the result being to effectively "seal" the major portion of the flavor within the particle and out of contact with the atmosphere.

In the case of very delicate and weak flavors, such as strawberry, it may be necessary to replace more than one-third of the total sugar content of the dessert with the flavor-carrying massecuite in order to provide a sufficient amount of flavoring substance. The proportion of solidified massecuite used in the dessert is in consequence variable, more or less being used, depending upon such factors as the strength of the flavor, and the strength of flavor and the degree of sweetness desired in the finished product (the replacement of ordinary sugar with dextrose results in a product that is slightly less sweet but in consequence better adapted as a carrier of delicate flavors).

Soluble flavors, as for example, strawberry, raspberry and cherry, dissolve in the crystallizing magma or in the syrup phase of the massecuite and at no time form a part of the crystalline or actual solid structure of the mass, inasmuch as sufficient water for the crystallizing function is left in the batch at the time it is cooked. In the case of flavors which are essentially insoluble in the syrup films, as for example, the volatile essential oils, lemon, orange, lime, etc., the addition of the oil to the crystallizing massecuite at first results in a heterogeneous dispersion. As the agitation proceeds, however, the crystal structure becomes more and more compact, and the migration of the oil increasingly difficult. A point is eventually reached where it is no longer capable of separating out, but is held firmly with or in the syrup comprising the interstitial films.

Whereas in a usual gelatin dessert there will be a loss and impairment of flavor taking place within about three weeks from date of preparation which makes it difficult if not impossible to recognize its flavor-source, that is as to whether the flavoring substance used was, for example, strawberry, raspberry or cherry, on the other hand a dessert made by the method herein described retains its naturalness and strength practically unimpaired for a period upwards of six months.

An advantage of the invention is that a larger amount of flavor (sufficient to impart a pleasing and definitely recognizable flavor-character to the jelly) may be utilized in dessert and jelly powders without causing them to become sticky or lumpy. Also, the flavors may be added while the syrup or massecuite is cold and are at no time impaired by exposure to heat or excessive volumes of air either in tumbling or air drying as at present.

Further, the extended exposure to oxidation to which desserts made by the usual method have been subjected has made it necessary in most instances to use citrus oils from which the terpenes have been removed. Such oils are generally recognized as being inferior in fidelity of flavor to the flavor of the natural expressed oils which have not been so processed or treated. In the herein described procedure, it is possible to use the natural untreated oils and to increase the palatability of the product thereby.

In the case of naturally weak or delicate flavors such as strawberry, where fairly substantial amounts of the flavor must be introduced into the final product, natural fruit essences may be used instead of artificial flavors or natural flavors which have been fortified with artificial flavors, because it is possible to entrap and preserve in the internal particle films much larger quantities of flavor than it is practicable to dispose on the surfaces of the crystals by the usual methods.

The dessert preparations and other food mixtures in which the flavoring material of the invention may be utilized include in addition to gelatin dessert hereinbefore specifically described, other prepared jelly powders, beverage powders, meringue powders, icing powders, ice cream powders, and preparations of a similar nature which are usually packaged in solid comminuted form, and contain a sugar as a substantial ingredient.

It is desired to point out that the "shelf life" of the flavoring material prepared from a massecuite having a flavoring substance in its liquid phase may be further lengthened by incorporating a binder, such as pectin, whereby the water is held and protected from excessive evaporation; by utilizing a small amount of a hygroscopic agent, for example dry malt powder, in order to maintain the moisture content and by incorporating invertase in a sucrose massecuite to occasion the slow formation of liquid invert sugar, giving thereby a nondrying syrup.

The flavoring material, furthermore, may be prepared by dissolving a saccharine material in water, concentrating the solution, for example by flash evaporation, until a syrup of desired density is obtained, adding a flavoring substance to the hot syrup, and then introducing the mass onto a cold granite melangeur bed whereupon it is cooled, and it is crushed by the rotating granite rolls as it solidifies. This process, however, may not be as advantageous as the cold process due to contact of the flavoring substance with the heated syrup in those cases where a relatively volatile flavoring substance is used, or one in which the flavor is affected by higher temperatures.

Since certain changes in carrying out the above process, and certain modifications in the composition which embody the invention may be made without departing from its scope, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

I claim:

1. A process for the production of a sugar flavor-carrying material which comprises dissolving dextrose hydrate in water, concentrating until the mass contains from 9–30% water, cooling to a temperature below 98° F., and crystallizing with accompanying agitation and then solidifying to a hard brittle mass having a liquid phase and a high solid content.

2. A process for the production of a flavoring material, which comprises dissolving dextrose hydrate in water, concentrating until the mass contains from 9–30% water, cooling to a temperature below 98° F., crystallizing with accompanying vigorous agitation, introducing a flavoring substance, allowing crystallization to proceed to a hard brittle mass, and then comminuting.

3. A process for the production of a flavoring material, which comprises dissolving dextrose hydrate in water, concentrating the mass to a water content of about 9%, cooling to a temperature of about 60° F., crystallizing with agitation, introducing a flavoring substance during the crystallization, permitting crystallization to proceed until a hard brittle mass results, and then comminuting to a particle size of about 20-40 mesh.

4. A process for the production of a flavoring material which comprises preparing a sugar massecuite having a liquid phase and a high solid content by dissolving a sugar in water, concentrating and cooling the mass to an extent sufficient to effect the formation of a micro-crystalline structure, crystallizing said mass with accompanying agitation to effect such crystalline structure, incorporating a flavoring substance during crystallization, and solidifying to a hard, brittle mass whereby there is formed a massecuite in which the flavoring substance is disposed in the liquid phase and firmly held within the crystal structure.

5. A process for the production of a flavoring material which comprises preparing a dextrose hydrate massecuite having a liquid phase and a high solid content by dissolving dextrose hydrate in water, concentrating and cooling the mass to an extent sufficient to effect the formation of a micro-crystalline structure, crystallizing said mass with accompanying agitation to effect such crystalline structure, incorporating a flavoring substance during crystallization, and solidifying to a hard, brittle mass whereby there is formed a massecuite in which the flavoring substance is disposed in the liquid phase and firmly held within the crystal structure.

6. A process for the production of a sugar flavor-carrying material which comprises dissolving a sugar in water, concentrating the solution so formed until the mass contains from 9-30% water, cooling to a temperature below 98° F., crystallizing with accompanying agitation, and then solidifying to a hard, brittle mass having a liquid phase and a high solid content.

7. A flavoring material comprising a hard, brittle, dry-to-the-touch sugar massecuite having a solid and a liquid phase and a micro-crystalline structure, and a flavoring substance in said liquid phase, said flavoring substance being firmly held within the crystal structure of said massecuite.

8. A flavoring material comprising a hard, brittle, dry-to-the-touch dextrose hydrate massecuite having a solid and a liquid phase and a micro-crystalline structure, and a flavoring substance in said liquid phase, said flavoring substance being firmly held within the crystal structure of said massecuite.

9. A flavoring material comprising a hard, brittle, dry-to-the-touch dextrose hydrate massecuite having a solid and a liquid phase and a micro-crystalline structure, a flavoring substance in said liquid phase, said flavoring substance being firmly held within the crystal structure of said massecuite, and a coloring matter.

10. A flavoring material which comprises particles of a hard, brittle, non-hygroscopic, dry-to-the-touch sugar massecuite having a liquid phase, a high solid content and a micro-crystalline structure, a flavoring substance in said liquid phase, said flavoring substance being firmly held within the crystal structure of said massecuite, and said particles having an inner core of crystals surrounded by a liquid and an outer crust of solid crystalline material.

11. As an article of manufacture a hard, brittle, non-hygroscopic, dry-to-the-touch sugar massecuite having a solid and a liquid phase in an amount greater than the crystal water requirement of the sugar molecule and substantially not greater than 30%, a micro-crystalline structure, a high flavor absorptive capacity, and capable of being easily comminuted, said liquid phase being firmly held within the crystal structure of said massecuite.

12. As an article of manufacture a hard, brittle, non-hygroscopic, dry-to-the-touch dextrose hydrate massecuite having a liquid content greater than the crystal water requirement of the dextrose molecule and substantially not greater than 30%, a micro-crystalline structure, a high flavor absorptive capacity, and capable of being easily comminuted, said liquid being firmly held within the crystal structure of said massecuite.

ALBERT ADAMS LUND.